United States Patent [19]

Moebius

[11] Patent Number: 4,858,968
[45] Date of Patent: Aug. 22, 1989

[54] LOCKRING TUBE JOINT

[76] Inventor: Peter Moebius, 38 Oceanaire Dr., Rancho Palos Verdes, Calif. 90274

[21] Appl. No.: 169,388

[22] Filed: Mar. 17, 1988

[51] Int. Cl.$^4$ .............................................. F16L 13/14
[52] U.S. Cl. .................................. 285/382.2; 285/94; 29/520
[58] Field of Search ............... 285/382.2, 382.1, 382.7, 285/94; 29/508, 520

[56] References Cited

U.S. PATENT DOCUMENTS

| | | | |
|---|---|---|---|
| 2,389,233 | 11/1945 | Cowles | 285/382.7 X |
| 3,258,279 | 6/1966 | Johnsen | 285/382.7 X |
| 3,498,648 | 3/1970 | Hallesy | 285/382.2 X |
| 3,827,727 | 8/1974 | Moebius | 285/382.2 X |

Primary Examiner—Dave W. Arola
Attorney, Agent, or Firm—Freilich, Hornbaker, Rosen & Fernandez

[57] ABSTRACT

A lockring tube joint is described where the end portions of a pair of interfitting tubes are joined by a lockring, wherein the lockring can be installed with less force than prior lockrings and, despite lower installation forces, the tubes are securely held together. The lockring has a front section whose internal surface is tapered, a center section with a cylindrical inner surface of the same diameter as the smallest diameter of the front section, and a rear section forming a push surface for receiving forces to push the ring onto the tubes. The center section is relatively long and thin. As the lockring is pushed onto the interfitting tubes, the front section of the lockring encounters resistance to forward movement, while the center section section of the lockring is longitudinally compressed. The longitudinally compressed center section elastically grows in diameter, which avoids high friction contact with the outermost tube. When the lockring is installed and pushing forces are no longer applied, the center section springs back to its original, smaller cylindrical shape, wherein it compresses the tubes to hold them tightly together over an appreciable length of the tubes.

12 Claims, 2 Drawing Sheets

LOCKRING TUBE JOINT

BACKGROUND OF THE INVENTION

A pair of tubes can be joined by inserting the end of one tube into the end of the other in a telescoping fashion, and forcing an internally tapered lockring over the telescoped tube ends. Earlier U.S. Pat. Nos. 3,827,727 and 4,026,006 describe lockrings which are internally tapered for radially compressing the outermost tube to squeeze it tightly against the innermost tube. A large radial force results at the rear end of the taper where the lockring has its smallest internal diameter. While such lockrings can reliably join a pair of tubes, additional improvements are desirable.

A relatively large installation force, such as about 500 lbs., is required to push such a lockring over the tubes, to install a ring over ½ inch (external diameter) aluminum tubing. Where thinner wall tubing is used, a lower installation force would be desirable to avoid the possibility of buckling of the tubes. The elasticity of the tube joint, which is its strength when subjected to large changes in temperature (and consequent expansion or contraction) or when subject to loads, depends on the radial elasticity of the installed lockring and the proportion of the length of the lockring where it elastically squeezes the tubes together. A lockring and joint which enabled lower installation forces for the lockring while providing elastic compression of the tubes along a cylindrical portion of a considerable length of the ring would be of great value.

SUMMARY OF THE INVENTION

In accordance with one embodiment of the present invention, a lockring and a tube joint are provided, which minimize the installation force for the ring and which provide a long cylindrical joint length where the ring closely and elastically compresses the tubes. The lockring has front, center, and rear sections. The front section has a tapered internal surface for plastically and elastically deforming the tubes into intimate contact. The rear section forms a push surface against which installation force is applied. The center section has a cylindrical internal surface of the same internal diameter as the smallest diameter portion of the tapered front section. When a forward installation force is applied to the rear section, while the front section encounters the usual resistance to installation, the center section is longitudinally compressed. The center section is long and thin enough that the longitudinal compression occurring during installation causes the center section to undergo radially outward deflection. The outward deflection (i.e. the increase in internal diameter) avoids high frictional resistance between the center section and the outermost tube to minimize the installation force. However, once the ring is installed and the installation force is no longer applied, the center section is no longer outwardly deflected. Now the center section returns toward its original shape and size, to resiliently tightly squeeze the tubes into intimate contact along a considerable length.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
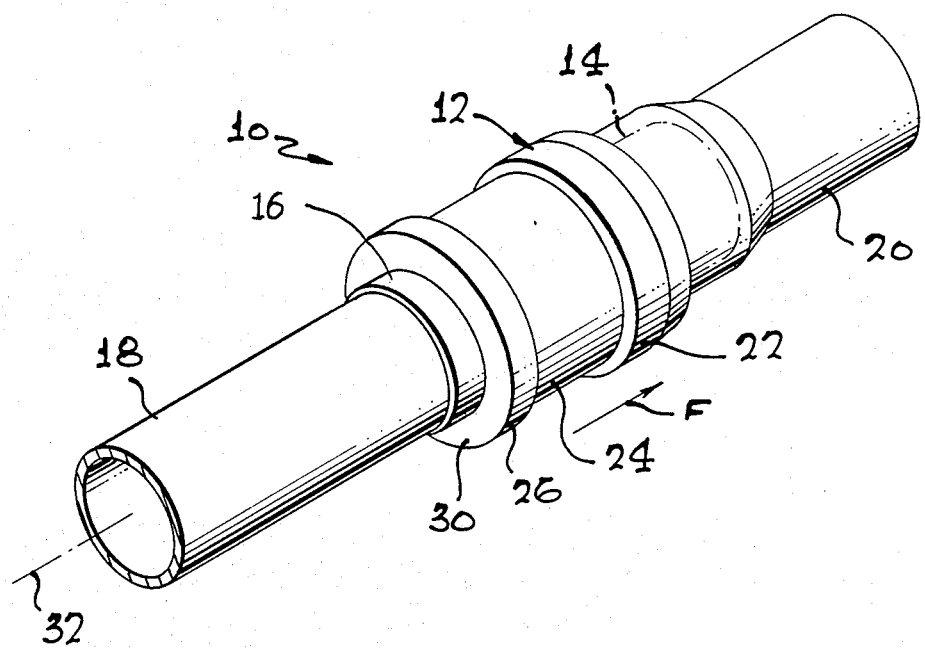
FIG. 1 is a perspective view of a joint of the present invention, showing a lockring fully installed on a pair of interfitting tubes.

FIG. 1 illustrates an assembled joint 10 of the present invention, which includes a lockring 12 lying around the end portions 14, 16 of a pair of tubes 18, 20 that have an axis 32. The tube end portions are telescoped or interfitting, with a first of the tubes 18 lying within a second of the tubes 20. The lockring 12 has an internally tapered front section 22 which presses the tubes into intimate contact durng installation of the ring, a center section 24 which holds the tubes tightly compressed together, and a rear section 26 which forms a push surface 30 that is pushed in a forward direction F to install the ring onto the interfitting tubes.

Figure 2:
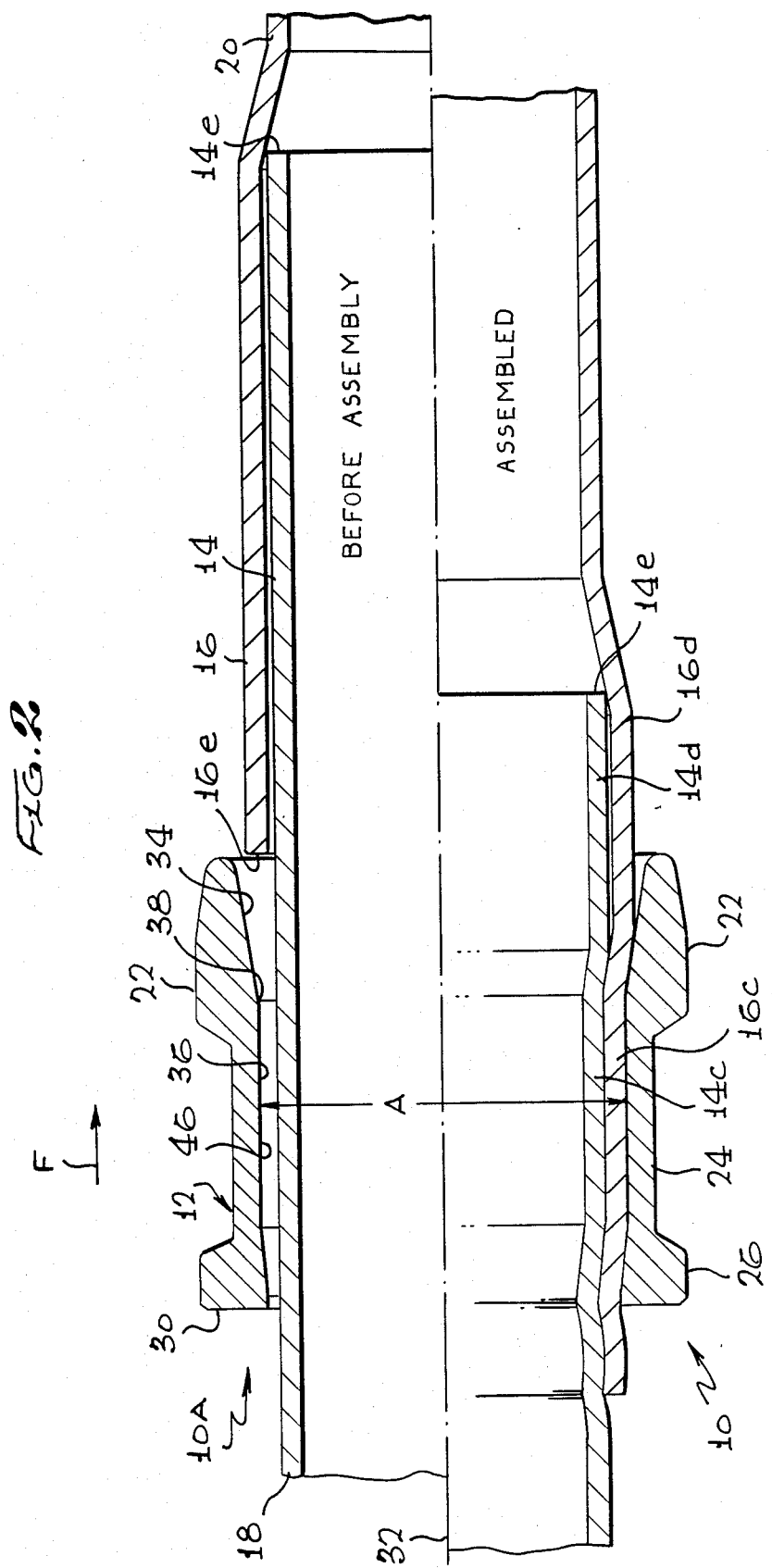
FIG. 2 is a sectional view of the apparatus of FIG. 1, with the upper portion of the figure above the axis of the tubes showing the ring and tubes prior to assembly, and with the lower portion of the figure showing the ring and tubes after assembly.

FIG. 2 includes two figure portions, one above and the other below the axis 32 of the tubes. The figure portion above the axis shows the joint 10A prior to assembly (prior to ring installation), while the figure portion below the axis shows the joint 10 after assembly. The two tubes 18, 20 to be joined have equal inside and outside diameters along most of their lengths, the end portion 16 of the second tube being enlarged to receive the end portion 14 of the first tube until the extreme tube ends 14e, 16e are located as shown. Prior to such interfitting, the lockring 12 has been slipped onto the first tube 18. While the tubes are gripped, force is applied to the push surface 30 of the ring to push it forwardly. The front section 22 of the ring has an internal surface 34 that is tapered so that as the ring moves forwardly the front section presses and deforms the tubes into intimate contact. The lockring is moved forward until it achieves the position shown in the bottom half of the figure in the joint 10. With the ring fully installed, the two tube end portions 14, 16 have compressed parts 14c, 16c that are resiliently squeezed together along the entire length of the center section 24 of the ring as well as a portion of the front section 22 and along the small length of the rear section 26. Most of the tight squeezing of the tubes together is performed by the center section 24. The cylindrical inside surface 36 of the center section has an internal diameter A equal to the internal diameter of the narrowest part of the front section, at the location 38. The parts 14d, 16d of the tube end portions forward of the lockring are uncompressed.

If the center section 24 of the lockring had a large wall thickness so it was substantially rigid against deflection, then it would require a larger installation force to install the ring. Such a large force would be required because there would be high friction not only at the front section 22 of the ring where it compresses the tubes, but also along the long length of the internal surface 36 of the center section which was slid along the tubes while lying in interference fit with the outermost tube. Of course, it would be possible to increase the internal diameter A of the center section, but then the center section could not serve to clamp the tubes tightly together after installation of the ring.

Figure 3:
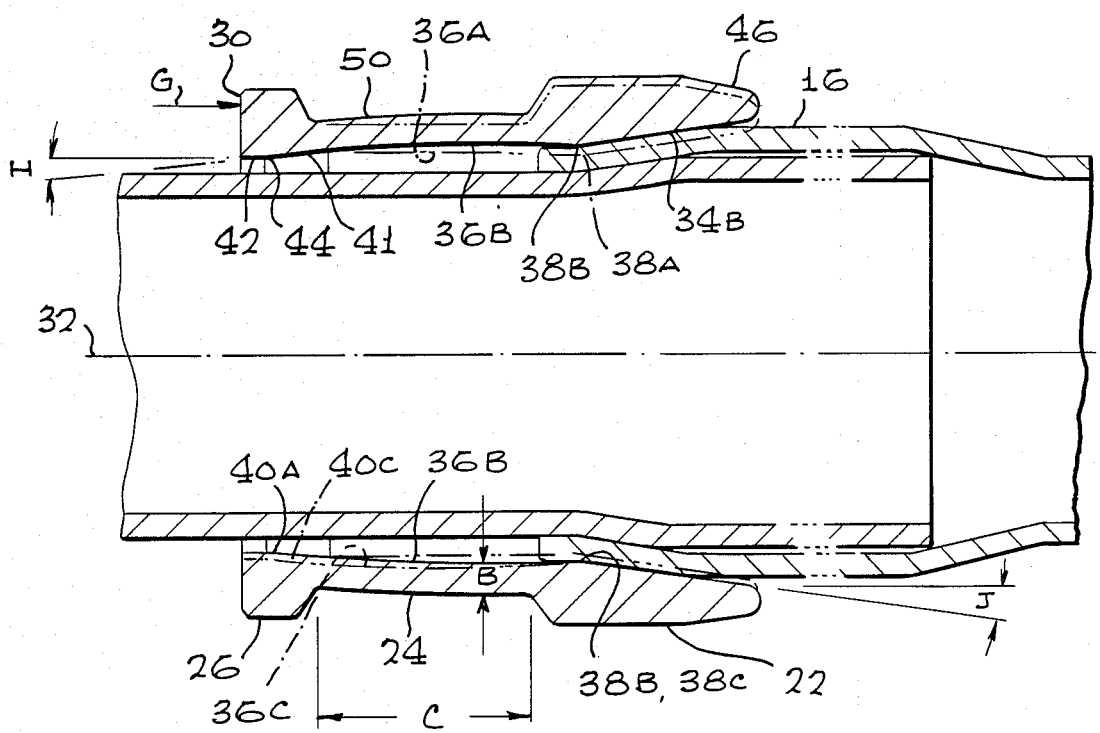
FIG. 3 is a sectional view of the joint of FIG. 2 in the course of assembly, but with the drawing of the lockring devoid of section lines, and also showing in phantom lines the ring both prior to installation and near full installation.

Referring to FIG. 3, applicant reduces the installation force by constructing the center section 24 so it has a relatively thin wall thickness B and a relatively long length C. During installation, when a forward installation force G is applied to the rear surface 30, a corresponding rearward force results along the internal tapered surface 34B of the front section. As a result of these forces, the center section 24 is under axial (along axis 32) compression. This compression results in the center section undergoing a "barrel-type" deflection wherein its internal surface indicated at 36B is bowed outwardly, in the manner of deflection of a column under axial compression. Near the beginning of installation the front section location of minimum diameter is deflected from position 38A to 38B, and the internal surface of the center section is deflected from configuration 36A to 36B. The configuration 36B represents the combination of radially outward deflection of the front of the center section, and a barrel-like outward bowing of the rest of the center section. When the rear section 26 of the lockring reaches and is pressed over the outer tube portion 16, its internal surface is expanded, or outwardly deflected, from position 40A to position 40C.

In the configuration illustrated at 36C the internal surface 36C of the center section is shown outwardly bowed in a barrel configuration, which results in most of the center section being out of contact with the outer tube end portion 16, or at least out of high friction contact with the tube. Since there is high friction contact of the ring with the tube only along the rear portion of the front section 22 and along the rear section 26, but not in between, the installation force is reduced. The amount of radially outward bowing of the internal surface 36C of the center section with respect to the front section location 38C is small, being measured in thousandths or ten thousandths of an inch. However, such an amount of outward bowing is sufficient to avoid high pressure contact of the center section internal surface 36C with the tube, and therefore it reduces the installation force. The installation is analogous to pushing a rubber grip onto a bicycle handlebar, where forward force on the rear end of the grip causes most of the rubber grip to expand in diameter; thereafter the rubber grip contracts again and is then tightly held. Where the tubes have thin walls and/or are of relatively soft material such as aluminum, minimization of installation force is important in avoiding buckling of the tubes during installation. This allows the lockring to be used to join thin tubes of soft material.

At the completion of installation, when the ring has been moved to its final position and the installation force G is no longer applied, the center section 24 of the ring is no longer axially compressed and correspondingly radially expanded. Now the center section tends to return to its original size and configuration wherein it was cylindrical and of the same internal diameter as the location 38 of the front section of the ring. The center section then resiliently grips the tubes and maintains them tightly pressed against one another. Such resilient interference fit along the considerable length C of the center section results in a tight and reliable joint.

Applicant forms the rear section 26 of the ring with a tapered internal surface 41 portion ending in a rearward short surface portion 42 of constant diameter. The tapered portion 41, whose location 44 of minimum diameter has a smaller diameter than the front section location 38, produces additional compression along a short length of the interfitting tube end portions.

The lockring is preferably formed of a material having about the same modulus of elasticity as the material of the tubes, and the center section 24 of the lockring preferably has a wall thickness B that is about the same or less than the wall thickness of each of the tubes. However, the yield limit of the material of the ring is preferably more than twice that of the tube material. In one example, one-half inch (external diameter) aluminum tubes having a wall thickness of 0.030 inch (0.75 mm) are to be joined, the material of the tubes having a modulus of elasticity E of 10,000 ksi and a yield strength of 5 ksi to 7 ksi (before work hardening from deformation), such tubing being commonly used in heat exchangers. The lockring has substantially the configuration shown in the figures, and is formed of an aluminum alloy (modulus of elasticity of 10,000 ksi) with its center section having a wall thickness of 0.035 inch (0.90 mm) and its front section having a wall thickness of 0.060 inch (1.50 mm) at location 38. The front section has an internal taper angle J of about 5° on each side. The lockring is formed of aluminum alloy 6061-T6 which has a yield limit of 40 ksi and an ultimate strength of 42 ksi.

As the ring is pushed onto the interfitting tubes as shown in FIG. 3, the front section 22 of the ring encounters a working stress of about 20,000 psi and elastically expands by about 1.5 mil (1 mil equals 1 thousandth inch). A working stress about equal to one-half the yield strength is desirable. A considerably greater working stress is undesirable because it raises the possibility of reaching the yield strength and resulting in plastic deformation of the ring. A substantially lower working stress is undesirable because it results in a smaller elastic expansion of the ring. The tubes are elastically and plastically deformed by the lockring to a small enough diameter to fit through the smallest diameter portion 38 of the front section of the ring. The plastic deformation also cold works the tubes, which increases their yield strength to perhaps 10 ksi. Under a working stress of 1C ksi (half the load on the ring is taken up by each tube), the tubes are elastically deformed by about 0.5 mil in diameter. Thus, there is an elastic interference fit of about 2 mil in diameter between the ring and tubes.

During installation, the center section undergoes a barrel-like outward deflection indicated at 36C, with such outward deflection being small, such as 2 mils to 2.5 mils in diameter, but this is sufficient to avoid high friction contact of the deflected center section 24 with the tube during installation. An outward bowing (before reaching and lying directly around the tubes) of the middle 46 of the center section by at least half the elastic expansion of the front section at 38B is necessary to avoid high frictional contact of the center section with the tubes to significantly reduce the installation force. When installation is complete, the center section tends to spring back to its original (smaller) diameter, but the outer tube end portion 16 has an undeflected diameter about 2 mil greater than the original diameter (before installation) of the center section. Thus, there is about a 2 mil interference fit between the tubes and ring at the rearward portion 38 of the front section and along the entire length C of the front center section, where the ring elastically presses tightly against the tubes to hold the tubes tightly to each other. Since such interference fit extends over a considerable distance C, the tube joint is strong.

While the center section of the above ring has a wall thickness of about 35 mil, applicant would prefer a somewhat thinner wall thickness such as about 20 to 25 mil to provide greater deflection during installation to decrease installation force. However, tolerances in the inside and outside diameters of the lockring required for manufacture at reasonable cost, lead to a greater wall thickness to assure that the wall will never be too thin. The wall thickness of the center section preferably should be at least 70% but not more than 130% of the wall thickness of each of the tubes. The internal diameter of the middle of the center section (where maximum deflection occurs during installation) could be made slightly smaller (e.g. by 1 or 2 mils) than the front section location 38, but it is difficult to economically do this. It may be noted that higher yield strength aluminum alloys are available such as type 6062-T9 which has a yield strength of 55 ksi, which can allow greater elastic expansion without the working stress exceeding about one-half the yield strength.

The rear section 26 of the ring has an internal taper of an angle H of about 3° at each side, which results in the diameter of the rear section at the location 44 being about 4 mils less than the internal diameter along the center section 24. The rear section produces an additional reduction of the tube diameters after most of the length of the lockring is installed on the tubes, when the ring is well aligned with the tubes and a tendancy of cocking of the ring has been eliminated. This provides a location where the tubes are reliably tightly pressed to one another to further avoid leakage of fluid (liquid or gas). The front and rear sections have the same outside diameter to aid in machining. The center section is formed by a groove 50 in the outside of the ring. The front section has an outside taper at its forward portion 46 to aid in aligning the lockring in an automatic feeder.

Tests of the above-described one-half inch lockring, which has a coating of Teflon or other dry lubricant for installation on the above-described aluminum tubes shows that the installation force is about 370 lbs. to 375 lbs. A similar lockring, but which had a center section of the same thickness as the front section, required an installation force of 500 lbs. to 520 lbs. which is about 37% greater than for the lockring of the invention. The one-half inch lockring of a soft aluminum tube joint allowed the joint to withstand 110° twist over a four inch length of the tubing before the joint slipped. The joint also passed a leak test with 600 psi of nitrogen and a hydraulic burst test of at least 2500 psi at which the tube burst.

Thus, the invention provides a lockring for joining interfitting tubes, and a tube joint, which minimizes the installation force for the lockring. The lockring has an external groove resulting in a center section of smaller wall thickness than the wall thickness at the location along the tapered front section which has the smallest internal diameter. The center section has a uniform internal diameter (i.e. it has a cylindrical internal surface) equal to the smallest diameter of the front section. The length of the center section is more than three times greater, and preferably at least about five times greater than the wall thickness of the center section. The modulus of elasticity of the ring and the wall thickness of the center section of the ring are preferably about the same as the modulus of the tubes and the wall thickness of the tubes. However, the yield strength of the ring is more than twice that of the tubes. The ring has an internally tapered rear section which further reduces the tube diameters.

Although particular embodiments of the invention have been described and illustrated herein, it is recognized that modifications and variations may readily occur to those skilled in the art and consequently it is intended to cover such modifications and equivalents.

What is claimed is:

1. Apparatus for joining the ends of a pair of interfitting tubes wherein the end portion of a first tube lies closely within the end portion of said second tube, and wherein said second tube end portion has a first predetermined outside diameter, comprising:

a lockring having front, center and rear sections, said front section having an internal surface which is tapered in a forward radially-outward direction and which has a predetermined minimum diameter which is less than said first diameter, said center section having a cylindrical internal surface of said predetermined minimum diameter, and said rear section forming a rearwardly-facing push surface;

said center section being so constructed and arranged in the relationship of the length to the thickness thereof so it elastically bows outwardly far enough to avoid high frictional contact with said second tube when said ring is pushed over a tube by a force applied to said push surface while said front section squeezes said tube end portions to reduce their diameters.

2. The apparatus described in claim 1 wherein:
said center section has a smaller outside diameter than said forward section at the location of said minimum diameter of said forward section.

3. The apparatus described in claim 1 wherein:
the length of said center section is over three times the thickness of the walls of said center section, whereby to permit substantial outward flexing of said center section.

4. The apparatus described in claim 1 wherein:
said first and second tubes are each constructed of material having a predetermined modulus of elasticity, said tubes each have substantially a predetermined wall thickness, said lockring is constructed of material of about the same modulus of elasticity as said tube material and said center section of said lockring has about the same wall thickness as said wall thickness of said tubes;
the material of said lockring having a yield limit more than twice that of said tube material.

5. The apparatus described in claim 1 wherein:
said rear section has a forward location of the same internal diameter as said center section, and has an internal taper which results in a progressively smaller diameter in a rearward direction.

6. Apparatus for joining the ends of a pair of interfitting tubes wherein the end portion of a first tube lies closely within the end portion of said second tube, and wherein said end portion of said second tube has a predetermined outside diameter comprising:

a lockring having front, center and rear sections, said front section having an internal surface which is tapered in a forward radially-outward direction and which has a location of predetermined minimum diameter, said minimum diameter being less than said predetermined outside diameter of said second tube end portion, said center section having a cylindrical internal surface of said predetermined minimum diameter, and said rear section forming a rearwardly-facing push surface, said center section having a smaller outside diameter than said forward section at the location of said minimum diameter and having a length of more than three times its wall thickness, the length of said center section being great enough that said center section bows outwardly far enough to avoid high frictional contact with said second tube end portion when said lockring is pushed over said second tube end portion by a force applied to said push surface.

7. A tube joint comprising:

first and second tubes each having walls and having about the same wall thickness, said tubes having end portions and the end portion of said first tube lying telescoped closely within the end portion of said second tube, said tube end portions having compressed and uncompressed parts;

a lockring having a front section, a center section, and a rear section, said front section having an internal taper with a location of smallest inside diameter which is less than the outside diameter of the end portion of said second tube at the uncompressed part thereof, and said center section having a cylindrical internal surface of an inside diameter equal to the inside diameter of said front section location of smallest inside diameter;

said rear section having a push surface for receiving push forces, and said center section having a length at least three times its wall thickness to facilitate its deflection away from and against the outside of said second tube;

said lockring lying around the compressed part of said end portion of said second tube, with said center section compressing said second tube, the wall thickness of said center section being about the same as the wall thickness of each of said tubes at said end portions, and the modulus of elasticity of said ring and tubes being about the same.

8. The joint described in claim 7 wherein:

said tubes and ring are each formed of an alloy consisting primarily of aluminum and having a modulus of elasticity of about 10,000 ksi but the alloy of said ring has a yield limit a plurality of times greater than the yield limit of the material of each of said tubes.

9. The joint described in claim 7 wherein:

said lockring has a groove in its outer surface along said center section, where said lockring has a smaller external diameter than along the rear of said front section and said rear section.

10. A method for joining a pair of tubes comprising:

inserting an end portion of a first tube into an end portion of a second tube, wherein the outside diameter of said end portion of said first tube is about the same as the inside diameter of said end portion of said second tube;

placing a lockring which has an internally tapered front section whose minimum internal diameter is less than the outside diameter of said second tube end portion, a cylindrical center section of smaller internal diameter than the outside diameter of said second tube end portion, and a rear section forming a rearwardly-facing push surface, over said first tube with said front section closest to said second tube;

moving said lockring forwardly including moving said tapered front section forwardly over said second tube end portion to reduce the diameter of said second tube end portion and the first tube end portion lying therewithin and to apply a rearward force to said lockring front section, including pushing said push surface forwardly to move said lockring forwardly, and elastically deflecting said center section radially outwardly under the forces on said front and rear sections to avoid high friction between said center section and said second tube end portion; and ceasing to move said ring forwardly including ceasing to apply a force to said push surface, and allowing said center section to undeflect and press radially inwardly on said second tube end portion.

11. Apparatus for joining the ends of a pair of interfitting tubes wherein the end portion of a first tube lies within the end portion of said second tube, and wherein said end portion of said second tube has a predetermined outside diameter comprising:

a lockring having front, center and rear sections, said front section having an internal surface which is tapered in a forward radially-outward direction and which has a location of predetermined minimum diameter, said minimum diameter being less than said predetermined outside diameter of said second tube end portion, said center section having a cylindrical internal surface of said predetermined minimum diameter, and said rear section forming a rearwardly-facing push surface, said center section having a smaller outside diameter than said forward section at the location of said minimum diameter and having a length of more than three times its wall thickness, the length of said center section being great enough that said center section bows outwardly far enough to avoid high frictional contact with said second tube end portion when said lockring is pushed over said second tube end portion by a force applied to said push surface;

said first and second tubes each being constructed of material having a predetermined modulus of elasticity, said tubes each having substantially a predetermined wall thickness, and said lockring is constructed of material of about the same modulus of elasticity as said tube material but of over twice the yield strength, and said center section of said lockring has about the same thickness as said wall thickness of said tubes.

12. Apparatus for joining the ends of a pair of interfitting tubes wherein the end portion of a first tube lies within the end portion of said second tube, and wherein said end portion of said second tube has a predetermined outside diameter comprising:

a lockring having front, center and rear sections, said front section having an internal surface which is tapered in a forward radially-outward direction and which has a location of predetermined minimum diameter, said minimum diameter being less than said predetermined outside diameter of said second tube end portion, said center section having a cylindrical internal surface of said predetermined minimum diameter, and said rear section forming a rearwardly-facing push surface, said center section having a smaller outside diameter than said forward section at the location of said minimum diameter and having a length of at least five times its wall thickness.

* * * * *